United States Patent [19]

Sutliff

[11] 3,929,303

[45] Dec. 30, 1975

[54] FILM CARTRIDGE WITH RETAINING RING AROUND A SUPPLY COIL

[76] Inventor: Robert C. Sutliff, 1669 Lake Ave., Rochester, N.Y. 14615

[22] Filed: Oct. 18, 1974

[21] Appl. No.: 768,849

[52] U.S. Cl. .............................. 242/194; 242/71.2
[51] Int. Cl. .......................................... G03b 23/02
[58] Field of Search ........... 242/193, 194, 197, 198, 242/199, 200, 71.1, 71.2; 352/72, 78

[56] References Cited
UNITED STATES PATENTS
3,208,685  9/1965  Edwards et al. .................... 242/194

FOREIGN PATENTS OR APPLICATIONS
1,984,902  5/1968  Germany

Primary Examiner—George F. Mautz
Attorney, Agent, or Firm—R. W. Hampton; William F. Delaney, Jr.

[57] ABSTRACT

A cartridge having a supply chamber for receiving a supply coil of film is provided with a ring located in the supply chamber generally around the outermost convolution of the supply coil to separate the coil from the peripheral walls of the supply chamber and prevent the coil from clockspringing.

11 Claims, 3 Drawing Figures

U.S. Patent    Dec. 30, 1975    3,929,303

FILM CARTRIDGE WITH RETAINING RING AROUND A SUPPLY COIL

BACKGROUND OF THE INVENTION

The present invention relates to a motion picture film cartridge and more particularly to a motion picture film cartridge of the type having a coreless film supply.

Motion picture film cartridges adapted to be inserted into cinematographic apparatus are well known in the art and are generally loaded with film which is perforated along at least one edge and which moves in a path from a supply roll, past an exposure aperture to a take-up reel. An example of such a cartridge is disclosed in U.S. Pat. No. 3,208,686 which issued Sept. 28, 1965 in the name of Evan A. Edwards et al. When the cartridge is properly inserted into the cinematographic apparatus, a film advancing claw in the apparatus is positioned to engage the perforations of the film, and a take-up drive carried by the apparatus is operatively coupled to the take-up reel. In response to actuation of a suitable control mechanism in the cinematographic apparatus, the film advancing claw and the take-up drive are simultaneously energized such that the claw intermittently pulls unit lengths of the film past the exposure aperture and the take-up drive rotates the core of the take-up reel to wind film thereon.

It has been found that in handling a film cartridge, both before and after it is inserted into cinematographic apparatus, the coiled film contained therein has a tendency to clockspring when the cartridge is subjected to sharp movements or jarred in any manner. The term "clockspringing" as used herein means the radial displacement of successive outer convolutions of a roll of strip material relative to the central axis thereof, caused by the tendency of the coiled strip to unwind.

Generally, because the coil or roll of film in the supply chamber is not confined therein to a particular diameter, and, as the film has the inherent tendency to clockspring and increase the diameter of the coil, the outer convolution can slidably contact the walls of the supply chamber. The combined inertia and friction forces of the film in the supply chamber largely determine the force that the claw must overcome before it can smoothly advance the film a unit length past the exposure aperture. Thus, when the film slidably engages the walls of the supply chamber, the resulting friction forces can result in unsteady film registration in the exposure aperture and erratic apparatus and cartridge operation.

One solution to the problem of clockspringing film rolls is disclosed in U.S. Pat. No. 3,208,685 which issued Sept. 28, 1965, in the name of Evan A. Edwards et al. The Edwards et al. U.S. Pat. No. 3,208,685 discloses a flexible rotatable disk in the supply chamber of a film cartridge, which has a raised lip about its circumference for preventing the coiled supply roll from engaging the walls of the supply chamber. Although the disk disclosed in the Edwards et al. U.S. Pat. No. 3,208,685 has proven effective in commercially available cartridges, the present invention solves the "clockspring" problem in a different manner at a reduced manufacturing cost.

SUMMARY OF THE INVENTION

It is an object of this invention to provide a film cartridge for cinematographic apparatus with improved means for preventing the outer convolution of the supply roll of film from engaging the peripheral walls of the supply chamber, so that the forces opposing the unwinding of the film from the supply coil are reduced.

According to this invention a film cartridge having a supply chamber formed by peripheral walls and side walls for receiving a supply coil of film is provided with a ring located around the outermost convolution of the supply coil. If the coil becomes clocksprung and the outermost convolution of the coil expands radially into engagement with the ring, the ring can rotate with the coil to reduce friction and it prevents the film from engaging the peripheral walls of the supply chamber. Since the ring tends to extend into the normal path of withdrawal of the film, the ring is adapted to be deflected, preferably by an edge of the film, Such deflection may be accomplished by tilting the ring with respect to the coil, or by using a ring made of a sufficiently flexible material to permit flexure of a portion of the ring in an axial direction relative to the supply coil.

By means of this structure, the supply roll of film in a film cartridge for use in cinematographic apparatus is prevented from clockspringing by a ring which can be produced with less material and at less manufacturing cost than the prior art anti-friction disk.

DESCRIPTION OF THE PREFERRED EMBODIMENT

Figure 1:
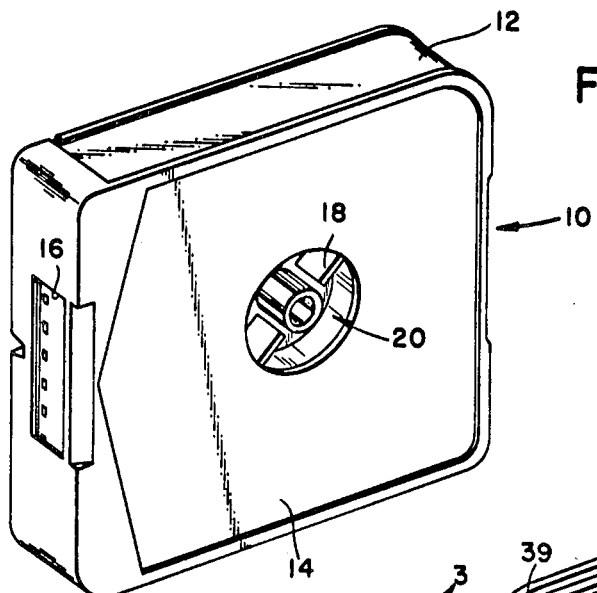
FIG. 1 is a perspective view of a loaded film cartridge constructed in accordance with a preferred embodiment of the invention.

For purposes of illustration the invention is disclosed as applied to a motion picture film cartridge 10 of the type which includes bo th a supply and a take-up chamber, such as is disclosed for example in U.S. Pat. No. 3,208,686 referenced above. As shown in the drawings, the film cartridge 10 comprises a generally rectangular substantially light-tight housing formed by an edge wall 12 and side walls 14. When the cartridge 10 is properly loaded into cinematographic apparatus (not shown), an exposure aperture 16 in the edge wall 12 will be positioned in alignment with a lens system (not shown) of the apparatus, and a hub 18 of a take-up core 20 will be drivingly engaged with a drive member (not shown) of the apparatus. The cartridge 10 includes a generally cylindrical supply chamber 22 and a generally cylindrical take-up chamber 24 on opposite sides of a common wall or partition 26 which defines the bottom of both the supply chamber and the take-up chamber. The partition 26 has a segmental opening 28. A portion 29 of the edge wall 12 forms a portion of the peripheral wall of the supply chamber. A curved wall 30 forms the remaining portion of the peripheral wall of the supply chamber. A conical locating boss 32 is formed on partition 26 substantially at its center and projects into the supply chamber 22.

Figure 2:
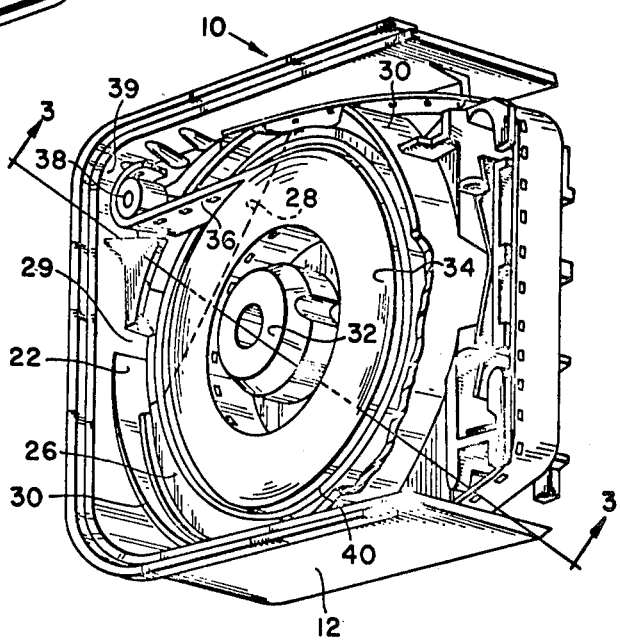
FIG. 2 is a perspective view of the body of the loaded film cartridge of FIG. 1 looking at the supply chamber side and with certain parts broken away to show internal construction.

As best shown in FIG. 2, a coreless coil or roll 34 of a filmstrip of film 36 is located in the supply chamber 22 coaxial to boss 32 in a plane substantially parallel to the partition 26 and the outside walls 14. The filmstrip 36 is tangentially unwound from the roll 34 in a path overlying the segmental opening 28 and is directed towards a snubber 38 which is preferably rotatable and is mounted on the body of the cartridge adjacent the curved interior surface 39 of the edge wall 12. The filmstrip is guided from the supply chamber 22 around the snubber 38 through a film path defined by the cartridge which directs the film past the exposure aperture 16 and into the take-up chamber 24 to the take-up core 20, seen more clearly in FIG. 3.

A ring 40 is located in the supply chamber around the outermost convolution of the supply roll of film 34. The ring 40 is not attached to the cartridge, so that it may be rotated with the supply roll 34 of film within the confines of the supply chamber 22 around the outermost convolution of the film roll.

Figure 3:
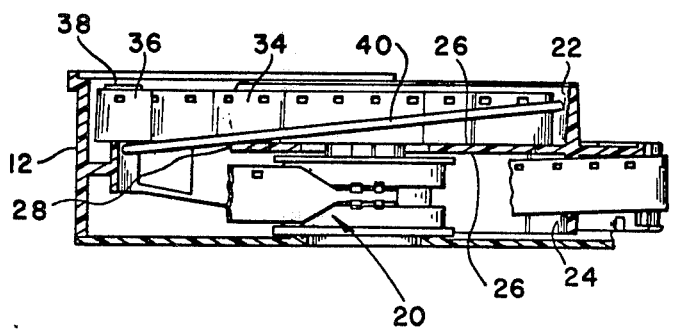
FIG. 3 is a cross-sectional view of an assembled film cartridge taken substantially along the line 3—3 of FIG. 2.

A portion of the ring overlies the segmental opening 28 and tends to extend into the normal path of withdrawal of the film 36 from the supply roll 34. As shown in FIG. 3 the filmstrip 36 is sufficiently rigid in an edgewise direction, that as it is drawn along its path from the supply roll, its edge rides over the ring 40 and tilts or deflects the ring or a portion of the ring overlying the opening 28 out of its normal plane. Such deflection can be accomplished by tilting the entire ring, or by flexing a portion of a ring made of a flexible material. At the same time the remaining portion of the ring 40 separates the outermost convolution of the supply roll from the peripheral wall of the supply chamber and prevents the spiral convolutions of the coil from being displaced axially from the roll relative to one another by an amount which might cause jamming of the filmstrip within the supply chamber 22.

Normally when the film is initially coiled into a supply roll 34, adjacent convolutions thereof tend to adhere to each other so that when the coil roll 34 is first inserted into the supply chamber 22 the outer convolution of the roll of film is positioned well within the peripheral wall of the supply chamber 22. The supply roll of film will generally retain its configuration and, as the film 36 is pulled from the supply chamber 22 to the take-up chamber 24, the roll will rotate about its axis about boss 32. Under these conditions the ring 40 may remain stationary in a tilted position with respect to the plane of the partition 26 or with the portion which overlies the opening 28 deflected into the opening by the edge of the film, thereby permitting the film to be tangentially withdrawn from the roll and along its path around the rotatable member 38.

If, however, the coiled roll of film 34 becomes clocksprung for some reason, the outermost convolution of the roll will engage the ring 40 which will prevent engagement of the film with the peripheral wall of the supply chamber. As the roll is rotated, the ring can rotate to reduce friction as the film is withdrawn tangentially from the supply roll. Thus, the ring prevents the coiled roll from jamming within the supply chamber.

The invention has been described in detail with particular reference to a preferred embodiment thereof, but it will be understood that variations and modifications can be effected within the spirit and scope of the invention.

I claim:

1. In a cartridge having a supply chamber formed by peripheral and side walls, a supply coil of flexible strip material positioned within the supply chamber so that the strip material can be withdrawn along a predetermined path from the outermost convolution of the supply coil, the improvement comprising a ring-shaped member within the chamber and having its radially inner portion disposed around the outermost convolution of the supply coil for continuously separating the outermost convolution of the coil from the peripheral wall of the supply chamber.

2. In a cartridge having a supply chamber formed by peripheral and side walls, a supply coil of flexible strip material positioned within the supply chamber so that the strip material can be withdrawn along a predetermined path from the outermost convolution of the supply coil, the improvement comprising ring-shaped means positioned within the chamber and having its radially inner portion disposed around the outermost convolution of the supply coil, the ring shaped means being rotatable with the outer convolution of said coil for separating sid outer convolution from said peripheral wall.

3. The improvement according to claim 2 wherein said ring shaped means is rotatable through a path, a portion of which path lies in the separation between said peripheral wall and said outer convolution of said supply coil and a portion of which path is axially displaced from said separation to allow withdrawal of said strip material along its predetermined path.

4. In a cartridge having a supply chamber formed by peripheral and side walls, a supply coil of flexible strip material positioned within the supply chamber so that the strip material can be withdrawn along a predetermined path from the outermost convolution of the supply coil, the improvement comprising a ring-shaped member within the chamber and having its radially inner portion disposed around the outermost convolution of the supply coil for continuously separating the outermost convolution of the coil from the peripheral wall of the supply chamber with a portion of the ring tending to extend into the path of withdrawal of the strip material, said portion being deflectable from the path of withdrawal of the strip material.

5. In a cartridge having a supply chamber formed by peripheral and side walls, a supply coil of flexible strip material positioned within the supply chamber so that said strip material can be withdrawn from the outermost convolution of said supply coil, the improvement comprising a ring within the chamber and having its radially inner portion disposed around the outermost convolution of said coil with a portion of said ring tending to extend into the normal path of withdrawal of said strip material, said ring being sufficiently flexible in an axial direction so as to be deflected axially by engagement of an edge of said strip material.

6. In a film cartridge having a supply chamber, a supply coil of filmstrip positioned within the supply chamber so that said filmstrip can be withdrawn from the outermost convolution of said supply coil, said supply chamber being formed by peripheral and side walls with one of the side walls having a segmental opening therein, the improvement comprising:

a rotatable ring within said supply chamber and having its radially inner portion separating the outermost convolution of said supply coil from the peripheral walls of said supply chamber with a portion of said ring overlying the segmental opening tending to extend into the normal path of withdrawal of said filmstrip, said portion of said ring being deflected into said opening by engagement of an edge of said filmstrip.

7. A cartridge for roll film, particularly for 8 millimeter motion picture film, comprising a housing defining a chamber for a supply of convoluted roll film which is rotatable in said housing; and a rigid confining ring loosely mounted in said housing and surrounding in its entirety the outermost convolution of the film in said chamber, said confining ring being rotatable in said housing in response to rotation of the supply of convoluted roll film in said chamber.

8. A cartridge as defined in claim 7 for convoluted film having a predetermined width wherein the axial length of said ring is less than one-third of said predetermined width.

9. A cartridge as defined in claim 7, wherein said housing comprises a partition provided with an opening and wherein a portion of said ring is free to extend into said opening beyond the adjoining end face of convoluted film in said chamber.

10. A cartridge as defined in claim 9, wherein said ring normally abuts against said partition.

11. A cartridge for roll film, particularly for 8 millimeter motion picture film, comprising a housing defining a chamber for a supply of convoluted roll film which is rotatable in said housing, said housing comprising a partition provided with an opening arranged to permit passage of the leading end of convoluted film in said chamber while the film is being withdrawn from said chamber; and a confining ring loosely mounted in said housing and surrounding the outermost convolution of the film in said chamber, said ring normally abutting against said partition and a portion thereof being tiltable into said opening by the leading end of the film beyond the adjoining end face of convoluted film in said chamber.

* * * * *

UNITED STATES PATENT OFFICE
CERTIFICATE OF CORRECTION

PATENT NO. : 3,929,303
DATED : December 30, 1975
INVENTOR(S) : Robert C. Sutliff It is certified that error appears in the above-identified patent and that said Letters Patent are hereby corrected as shown below:

On the cover sheet, Column 1, between lines 4 and 5, insert the following lines
[73] Assignee:    Eastman Kodak Company
                  Rochester, N. Y.

On the cover sheet, Item [22], change the filing date to
-- Oct. 18, 1968 --.

Column 4, line 22, "sid" should read -- said --.

Signed and Sealed this eighteenth Day of May 1976

[SEAL]

Attest:

RUTH C. MASON
Attesting Officer

C. MARSHALL DANN
Commissioner of Patents and Trademarks